United States Patent [19]

Ohtomo et al.

[11] Patent Number: 5,763,037
[45] Date of Patent: Jun. 9, 1998

[54] BASE FOR OPTICAL RECORDING MEDIUM AND STAMPER FOR MANUFACTURING BASE OF OPTICAL RECORDING MEDIUM

[75] Inventors: Katsuhiko Ohtomo; Hiroshi Nomura, both of Miyagi, Japan

[73] Assignee: Sony Corporation, Tokyo, Japan

[21] Appl. No.: 569,108

[22] PCT Filed: Apr. 14, 1995

[86] PCT No.: PCT/JP95/00733

§ 371 Date: Dec. 18, 1995

§ 102(e) Date: Dec. 18, 1995

[87] PCT Pub. No.: WO95/28705

PCT Pub. Date: Oct. 26, 1995

[30] Foreign Application Priority Data

Apr. 18, 1994 [JP] Japan .................. 6-078387

[51] Int. Cl.⁶ .................................. B32B 3/00
[52] U.S. Cl. .................. 428/641; 428/64.2; 428/64.3; 428/64.4; 428/65.1; 428/65.2; 428/913; 369/275.1; 369/275.4; 369/277; 369/283
[58] Field of Search ................ 428/64.1, 64.2, 428/64.4, 64.7, 65.1, 65.2, 913; 369/275.1, 275.4, 277, 283

[56] References Cited

U.S. PATENT DOCUMENTS 4,947,384 8/1990 Suzuki et al. .................. 369/279
5,213,859 5/1993 Aoi et al. ...................... 428/64
5,344,683 9/1994 Shimizu ....................... 428/64
5,431,975 7/1995 Honguh et al. ................ 428/64.6

FOREIGN PATENT DOCUMENTS 5-47043   2/1993  Japan .
5-298705  11/1993 Japan .

*Primary Examiner*—Patrick Ryan
*Assistant Examiner*—Elizabeth Evans
*Attorney, Agent, or Firm*—Hill, Steadman & Simpson

[57] ABSTRACT

A stamper for manufacturing a base of an optical disc where grooves having a track pitch of 1.6 μm and width of 1.3 μm or less are formed by using synthetic resin material includes a plurality of projections for forming grooves and a plurality of recessed portions. The plurality of projections have a flat upper portion and a pair of rising portions provided on the both sides of the upper surface portion. The plurality of recessed portions are formed so that bottom surfaces provided continuously to the rising portions of the respective projections become flat. In this case, when width dimension of the rising portion is $\epsilon/2$, width $\epsilon/2$ of the rising portion is given by the following expression:

$$0.05 \text{ μm} \leq \epsilon/2 \leq 0.15 \text{ μm}$$

4 Claims, 8 Drawing Sheets

| STAMPER | NO. OF SHOTS 100 | NO. OF SHOTS 500 | NO. OF SHOTS 1000 |
|---|---|---|---|
| A | MOLD RELEASE FAILURE TAKES PLACE IN SOME STAMPERS | MOLD RELEASE FAILURE ALMOST DISAPPEARS | MOLD RELEASE FAILURE COMPLETELY DISAPPEARS |
| B | MOLD RELEASE FAILURE FREQUENTLY TAKES PLACE | MOLD RELEASE FAILURE HARDLY DISAPPEARS | MOLD RELEASE FAILURE STILL REMAINS |

FIG.4C

CHARACTERISTIC DIAGRAM
OF UPPER SURFACE WIDTH
OF GROOVE AND CNR

FIG.5

CHARACTERISTIC DIAGRAM
OF UPPER SURFACE WIDTH
OF GROOVE AND Ig

FIG.6

CHARACTERISTIC DIAGRAM
OF HEIGHT OF GROOVE AND RC
(GROOVE PORTION)

FIG.7

CHARACTERISTIC DIAGRAM
OF HEIGHT OF GROOVE AND
I3 MODULATION

BASE FOR OPTICAL RECORDING MEDIUM AND STAMPER FOR MANUFACTURING BASE OF OPTICAL RECORDING MEDIUM

TECHNICAL FIELD

This invention relates to a base or substrate for an optical recording medium and a stamper for manufacturing such a base for optical recording medium, and more particularly to a base for an optical recording medium having grooves and a stamper used for manufacturing a base of such an optical recording medium having grooves.

BACKGROUND OF THE INVENTION

Optical discs as an optical recording medium use light beams for recording or reproduction of information signals, and have various merits that they permit recording or reproduction of information signals of large information content, and have high reliability in reproduction of recorded information signals and recording of information signals with respect t/o deterioration with age, etc. Optical discs having such merits are widely used as information recording media of an information processing system, an audio disc system or a video disc system.

Such an optical disc consists of a disc base having light transmission property, a recording layer or a reflection layer formed on one surface of the disc base, and a protective layer for protecting the reflection layer or the recording layer. The optical disc thus constituted is manufactured through a process of making a recording original disc including a recording process for information signals, a mastering process of making a stamper including a metal mold making up process, etc., a process of molding a disc base, a film formation process of implementing a film formation onto the disc base, and post-processing process, etc.

In the mastering process, laser beams modulated on the basis of recording information signals are irradiated, by means of an optical head as a laser recording device, onto a glass base subject to rotationally driving on which photoresist is painted or coated, thereby allowing the photoresist layer to be exposed to light in correspondence with the information signal. After processing such as development, etc. is implemented to the glass base which has undergone exposure process, a stamper where uneven portions corresponding to information signals are transferred to the surface of metal material by the electrocasting process which carries out electrocasting of the metal material is formed on the glass base.

The stamper which has been made after undergoing the mastering process and the electrocasting process described above is mounted onto a forming metal mold. By filling resin material into the metal mold on which the stamper has been mounted, a disc base depressions or uneven portions corresponding to information signals have been transferred to the surface is mold ed. In the case of an optical disc where write-once or re-recording of information signals is permitted, film of a recording layer or a reflection layer is formed by vacuum deposition, etc. on the surface of the molded disc base. The disc base to which film formation has be implemented is completed as an optical disc via film coating process for the protective layer, or is completed via such coating process as rewritable optical disc. Hub for clamping the optical disc onto the disc rotational drive mechanism is attached to the optical disc thus completed, and or a label is printed thereon.

The detail of the above-described mastering process will now be described in more detail with reference to the attached drawings.

Figure 2A:
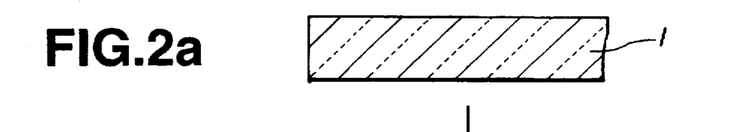
FIG. 2 is a model view for explaining manufacturing members in the process of the mastering process.
Figure 2B:
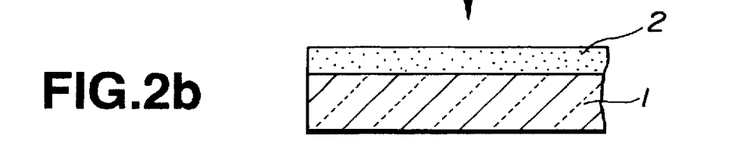

For the original disc material for making a stamper which will be described later, a glass base 1 which is permitted to ensure high surface accuracy and is formed by inexpensive soda lime glass is used as shown in FIG. 2a. This glass base 1 is caused to undergo regenerative treatment of abrasion polishing of the surface, etc. at the first step $S_1$, and is sufficiently cleaned by ultrasonic cleaner, etc., at the second step $S_2$. The glass base is then fitted onto a spinner. At the subsequent third step $S_3$, as shown in FIG. 2b, photoresist is dropped onto the surface of the glass base 1 in the state where it is mounted on the rotationally operated spinner, whereby a photosensitive layer 2 is formed. It is to be noted that tightness enhancement agent, such as, for example, hexamethyldisilazane, etc. is painted or coated in advance on the glass base 1 in order to hold tightness of the photoresist.

Since film thickness of the photosensitive layer 2 by the above-described photoresist is generally set to a value corresponding to a depth dimension of pits or grooves of the optical disc, the photosensitive layer is formed in the state where density of photoresist to be dropped and/or rotation number of the spinner are caused to precisely undergo management. At the subsequent fourth step $S_4$, the glass substrate 1 on which the photosensitive layer 2 is formed is caused to undergo cutting of information signals onto the photosensitive layer 2 by using a laser recording device 3. The laser recording device 3 is composed of a laser light source for emitting laser beams irradiated onto the photosensitive layer 2, a light modulator for modulating laser beams in accordance with information signals, a signal processing section for sending out information signals to the light modulator, an optical system and focus servo system for converging laser beams emitted from the laser light source onto the photosensitive layer 2, a rotational drive mechanism for the glass base 1, and the like.

Figure 2C:
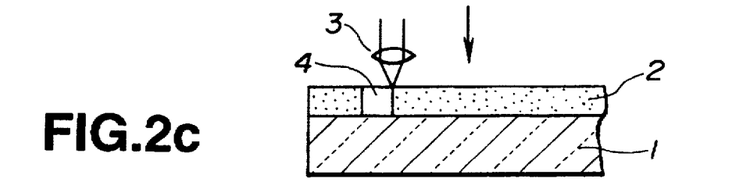
Figure 2D:
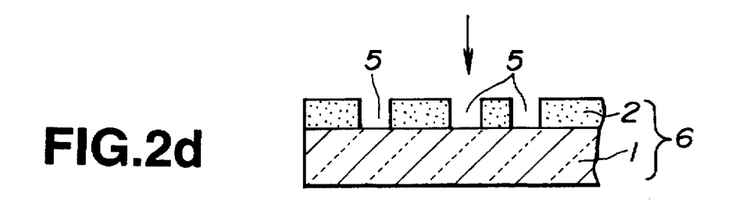

As shown in FIG. 2c, laser beams emitted from the laser recording device 3 are irradiated onto the photosensitive layer 2 of the glass base 1, whereby a latent image corresponding to the information signal is formed. Such latent images 4 are actualized by the development process which is the fifth step $S_5$, and are formed as groove formation projections 5 for forming grooves which are an information signal section on the surface of the optical disc. Namely, the glass base 1 which has undergone cutting of information signal by the laser recording device 3 is subjected to dropping of developer while rotating at the spin developer, whereby photoresist portions corresponding to the latent images 4 are removed. Thus, groove formation projections 5 of the projection pattern are formed on the surface as shown in FIG. 2d. At the subsequent sixth step $S_6$, baking treatment is implemented to the glass base 1 at a clean oven. Thus, baking onto the glass base 1 of groove formation projections 5 thus formed is carried out.

Figure 2E:
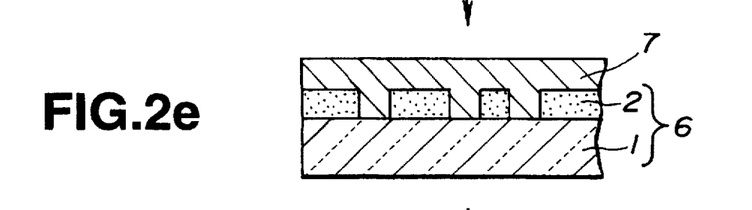

At the seventh step $S_7$, as shown in FIG. 2e, nickel film is formed, by sputtering method or electroless plating method, etc., on the surface of a glass original disc 6 made up by the above-mentioned process steps, whereby conductive film formation processing is carried out. It is to be noted that, with respect to the conductive film formation processing, e.g., processing for forming silver film by the vacuum deposition is also employed. At the subsequent eighth step $S_8$, electroplating processing is implemented to the glass original disc 6. In this case, the glass original disc 6 is connected to the minus electrode, and nickel chip is used for the plus electrode. By this electroplating processing, a nickel layer 7 having thickness dimension of about 300±5 μm is precipitated and formed on the glass original disc 6.

This nickel layer 7 is peeled from the glass original disc 6, whereby nickel master is formed. At the ninth step $S_9$, this nickel mater is caused to undergo abrasion polishing of the back side in the state where the surface side where the groove formation projections 5 of the projection pattern are formed are covered by a protective film.

Figure 2F:
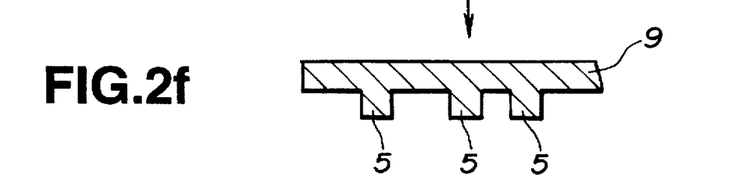

The back side abrasion (polishing) of the nickel mater is carried out in order to prevent uneven portions of the back side from being transferred onto the optical disc of the molded body at the time of injection molding. Generally, alumina, etc. is used as abrasive. Moreover, since photoresist is partially attached on the surface of the nickel master, resist removing processing to remove such attached portions by using solvent such as acetone, etc. is implemented at the tenth step $S_{10}$. This nickel master is used as the original disc for making up mother. Further, a stamper 9 is made up as shown in FIG. 2f with the mother being as the original disc. The stamper 9 formed by transfer of the mother is caused to undergo trimming processing of inside and outside diameters in correspondence with the forming metal mold of the optical disc, and is then caused to undergo finishing processing and cleaning processing. Thus, the stamper is completed.

The stamper 9 made up by the above-described mastering process is attached to the forming metal mold. Thus, molding of the disc base is carried out. As the molding method for the disc base, roughly speaking, the injection molding method, the compression molding method, the injection compression molding method, and so called 2P (Photo Polymerization) method as the photosensitive resin method are known. The injection molding method is a method most popularly employed, and is a method of injecting material resin in which acrylic resin or polycarbonate resin, etc. is molten into the injection forming metal mold on which the stamper is attached to thereby mold a disc base. In the case of the injection molding method, the molding cycle is short, transfer accuracy of information of uneven portions of the stamper based on the information signals is satisfactory, the stamper life time is also long, and mass-producibility is good.

The compression molding method is a method of kneading material resin to plasticize it to form a tablet to insert the tablet into a pressing machine to thereby transfer information of the stamper to the resin, thus to mold a disc base. This compression-molding method has the features that it is relatively simple and the transfer accuracy of the information signal portion is satisfactory, but also has the drawbacks that the mass-producibility is poor because the molding cycle is long and the stamper life time is short, etc.

The injection compression molding method is a method in which a forming metal mold on which stamper is attached is used to inject molten resin material into the forming metal mold thereafter to carry out mold closing or clamping operation, thus to mold a disc base. This injection compression molding method is such that the molding cycle is slightly prolonged and the life time of the stamper also slightly becomes short as compared to the injection molding method, but has the features that even if resin material having low fluidity characteristic such as polycarbonate resin, etc. is employed, satisfactory molding can be made, and the internal distortion of the optical disc is small.

The photosensitive resin method is a method of painting an coating ultraviolet hardening resin on a glass base serving as a disc base thereafter to allow the stamper to be in close contact with the glass base on which the ultraviolet hardening resin is painted to irradiate ultraviolet rays onto the ultraviolet hardening resin through the glass base to harden the resin thereafter to remove the stamper to thereby manufacture a disc base. This photosensitive resin method has the features that the device therefor is relatively simple, and the transfer accuracy of the information signal portion is also satisfactory and the stamper life time is long, but has the problems that materials to be used are limited and the base is required.

In the case of the optical disc, in the molding processing of a special shape wherein the projection dimension is extremely large with respect to the thickness dimension, various rigorous processing characteristics are required, e.g., maintenance of transparency after molding, accurate transfer property of the information signal portion, i.e., transfer property of uneven portions based on information signals of the stamper, and uniformity of dimensional accuracy or thickness, etc. are required. The fact that the stamper and the molded disc base are uniformly mold-released in a satisfactory condition is also an extremely important processing characteristic. Generally, in optical discs of the so-called narrow groove type in which ratio of width of the groove with respect to the track pitch is 1/2 or less, the characteristic indicating how mold releasing takes place between the stamper and the disc base (hereinafter referred to as the mold releasing characteristic between the stamper and the disc base depending upon circumstances) at the time of molding has been considered to result from the conductive film formation processing method or the resist removing method at the mastering process.

Namely, as the conductive film formation method with respect to the glass original disc, the sputtering method, the vacuum deposition method or the chemical plating method, etc. are employed as described above. Thereover as the resist removing method, the chemical processing method or the thermal treatment method, etc. is employed. The difference between these methods greats influences the mold releasing characteristic of the stamper. The mold release failure which takes place between the stamper and the disc base causes the molded disc base to produce the problems of unsatisfactory transfer of the information signal portion formed on the stamper, abnormal polarization, or unsatisfactory appearance, etc.

On the other hand, in optical discs of the so-called wide groove type in which ratio of width of the groove with respect to the track pitch is 1/2 or less, it has become clear that although there is any difference in the mold releasing characteristic resulting from difference in the conductive film formation method or the resist removing method, the groove shape itself greatly influences the mold releasing characteristic between the stamper and the molded disc base.

The stamper was of a structure in which the rising side surface forming groove surface is caused to have a shape closer to the vertical surface plane to thereby ensure width dimension of the groove surface of the disc base of the optical disc so that it is maximum, and to allow return light quantity from the groove to be great to thereby allow the carrier (reproduction signal)-to-noise ratio (CNR) of the recording layer to be great. Moreover, in order to permit high density recording, it is necessary to allow the contrast between the groove and the portion put between known as the "land" to be large. Also for this reason, the rising side surface of the groove formation projection of the stamper, which forms the groove of the disc base, is formed so that it takes a shape closer to the vertical surface plane.

Meanwhile, in order to improve the mold releasing characteristic between the stamper and the disc base to be molded, it is conceivable to allow taper angle of the rising side surface of the projection for forming groove of the disc base to be small, i.e., to allow so called through-taper to be large. In the disc base in which the taper angle of the rising side surface of the projection for forming groove is small as stated above, the width dimension of the groove surface would be also small. For this reason, such optical disc can obtain large push-pull signal for tracking error signal. However, there would take place the problem that return light quantity from the groove surface of laser beams irradiated onto the optical disc is lessened, so the CNR of the recording layer is also reduced.

In order to carry out promotion of mold release between the stamper and the disc base to be molded, a mold releasing agent is mixed into resin material to carry out molding processing. The releasing agent is attached to the cavity surface including the stamper by continuing the mold processing. Thus, mold release effect of the optical disc is improving and realized. Accordingly, a method of allowing mixing rate of the releasing agent to be large thus to improve the mold release characteristic is also studied, but the releasing agent exerts influence on the characteristic of the optical disc. In the case where the mixing rate of the releasing agent into material for molding the disc base is increased, error rate by deterioration with age of the molded disc base or the optical disc using such molded disc base is increased.

On the other hand, in the optical disc, various standardized values such as CNR, etc. are standardized. For example, in the standard of the optical disc system using a recordable optical disc which will be described later, an optical disc of the so-called wide groove type in which the width of groove is 1.2 μm or less is standardized and the CNR standardized value is standardized so that it is 46 dB or more. Moreover, in the case of the standard of the optical disc system, depth dimension of the groove, i.e., height of pit is determined by value (RC) obtained by dividing difference between return light quantity from the groove portion of laser beams irradiated when the optical disc is in the tracking OFF state and return light quantity from the land portion by average value, and is standardized so that it is equal to 0.35.

The design condition of the stamper for molding the optical disc which all satisfies respective standardized value conditions standardized in this way, particularly the dimensional condition of the projection for forming grooves of the optical disc would be restricted as a matter of course. Under the circumstances where it has not become clear that shape of the groove provides one cause of the mold release failure between the stamper and the optical disc, the dimensions and accuracy of respective portions has been studied in an effort to determine respective standardized value conditions. For this reason, in the case where mold release failure between the stamper and the disc base takes place, exchange into a new stamper in which no mold release failure takes place was carried out to thereby cope with such mold release failure.

SUMMARY OF THE INVENTION

An object of this invention is to provide a new stamper for manufacturing a base of an optical recording medium which can solve problems with the prior arts as described above.

Another object of this invention is to provide a new disc base which can solve problems with the prior arts as described above.

The stamper for manufacturing a base of the optical recording medium according to this invention can form grooves having width of 1.3 μm or less. This stamper has a plurality of projections for forming grooves and a plurality of recessed portions. The plurality of projections have a flat upper portion and a pair of rising portions provided on the both sides of the upper portion. The plurality of recessed portions are formed so that bottom surfaces provided continuously to the rising portions of the respective projections become flat. When width dimension of the rising portion of the stamper is $e/2$, the width dimension $e/2$ of the rising portion is expressed as follows:

$0.05 \ \mu m \leq e/2 \leq 0.15 \ \mu m$

Moreover, the stamper for manufacturing the base of the optical recording medium according to this invention is means in which synthetic resin material is used to manufacture a base of an optical recording medium in which grooves having width of 1.3 μm or less are formed. This stamper has a plurality of projections for forming grooves and a plurality of recessed portions. The plurality of projections have a flat upper portion and a pair of rising portions provided on the both sides of the upper surface portion. The plurality of recessed portions are formed so that bottom surfaces provided continuously to the rising portions of the respective projections become flat. When width dimension of the rising portion of the stamper is $e/2$, the width dimension $e/2$ of the rising portion is given by the following expression:

$0.05 \ \mu m \leq e/2 \leq 0.15 \ \mu m$

Further, the base for the optical recording medium according to this invention comprises a plurality of projections for forming grooves each provided with a flat upper portion and a pair of rising portions provided on the both sides of the upper surface portion, and a plurality of recessed portions having flat bottom surfaces provided continuously to the rising portions of the respective projections. The base for optical recording medium is formed by injection molding by using a stamper in which when width dimension of the rising portion is $e/2$, width dimension $e/2$ of the rising portion is given by the following expression:

$0.05 \ \mu m \leq e/2 \leq 0.15 \ \mu m$

Furthermore, the base for optical recording medium according to this invention is molded by a stamper comprising a plurality of projections provided with a flat upper portion and a pair of rising portions provided on the both sides of the upper portion, and a plurality of recessed portions having flat bottom surfaces provided continuously to the rising portions of the respective projections. The grooves formed at the base have a bottom surface portion formed by the upper surface portion of the stamper and a pair of inclined surfaces formed continuously to the bottom surfaces by the respective rising portions of the stamper. In addition, lands are formed by a plurality of recessed portions. In this case, width of the groove is 1.3 μm or less, and width w/2 of the inclined surface is expressed as follows:

$0.05 \ \mu m \leq w/2 \leq 0.15 \ \mu m$

Additional features and advantages of the present invention are described in, and will be apparent from, the detailed description of the presently preferred embodiments and from the drawings.

BRIEF DESCRIPTION OF THE DRAWINGS

FIGS. 4A to 4C are views showing comparison between the stamper according to this invention and the conventional stamper, wherein

DETAILED DESCRIPTION OF THE PRESENTLY PREFERRED EMBODIMENTS

More practical examples of a base for an optical recording medium and a stamper used for manufacturing such a base for optical recording medium according to this invention will now be described in detail with reference to the attached drawings.

Figure 1:
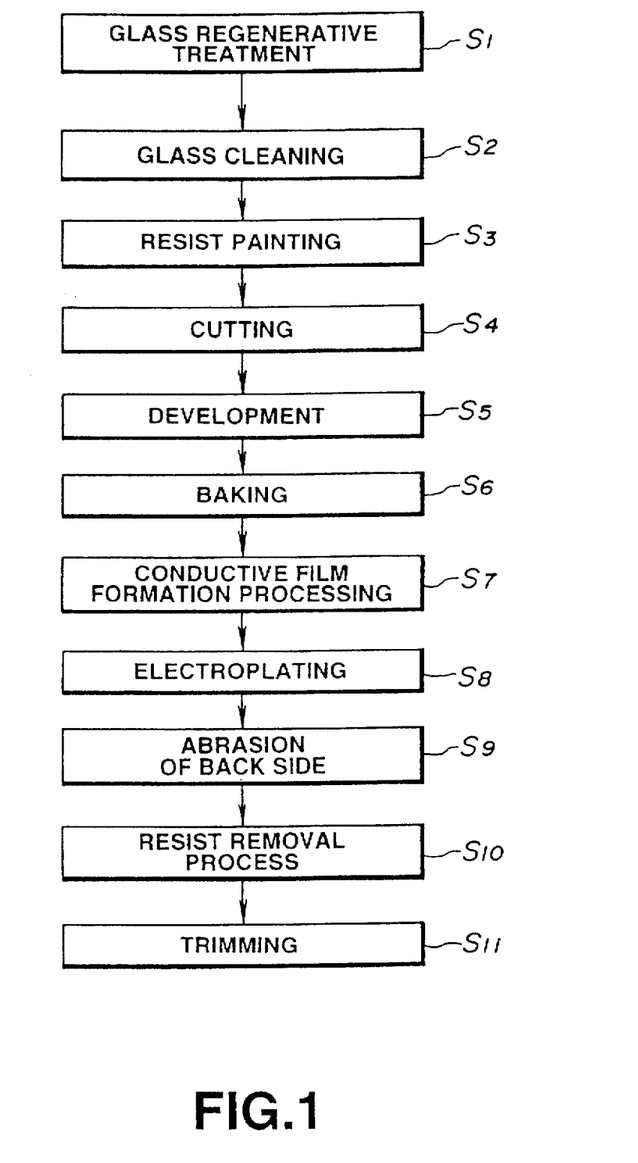
FIG. 1 is a process diagram for explaining mastering process in the process for manufacturing a disc-shaped optical recording medium.
Figure 3:
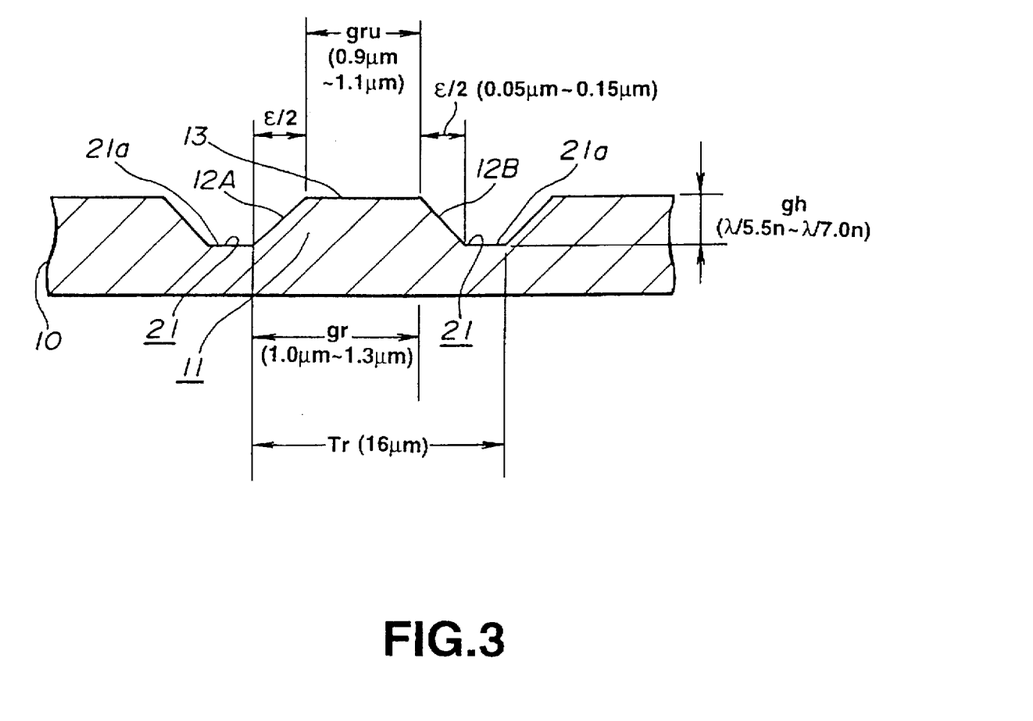
FIG. 3 is an essential part longitudinal cross sectional diagram showing the dimensional characteristic with respect to a stamper used when the disc-shaped optical recording medium according to this invention is manufactured.

A stamper 10 of this embodiment is used in molding an optical disc of the so-called wide groove type in which the width dimension of a projection which forms groove is set to 1.3 µm or less, wherein respective portions which form the recording track portion are respectively formed so that they fall within the dimensional range shown in FIG. 3. The stamper 10 shown in FIG. 3 is manufactured via process steps shown in FIGS. 1 and 2. A projection 11 for forming groove at the disc base to be molded provided at the stamper 10 is formed so that it takes a spiral shape or concentric circular shape. On the both sides of the projection 11 for forming the groove, recessed portions 21, 21 are respectively formed. Bottom surface portions 21a of these recessed portions 21, 21 are formed so that they become flat surface. Projections on the disc base formed by these recessed portions 21, 21 serves as a land.

In the stamper 10, respective rising side surfaces 12, 12 which are rising portions of the both sides of the projection 11 for forming groove of the disc base are formed. These rising side surfaces 12, 12 are formed as an inclined surface inclined toward the bottom surface portions 21a side of the recessed portions 21, 21 in such a manner that the base side of the projection 11 becomes broad in width. Accordingly, the projection 11 is formed so as to take a trapezoidal shape in cross section such that the base side is broad in width. The projection 11 which takes trapezoidal shape is formed, as shown in FIG. 3, within the dimensional range where the width gr of the bottom surface portion 21a is 1.0 µm to 1.3 µm, the width gru of an upper surface portion 13 is 0.9 µm to 1.1 µm, each width e/2 of the rising both side surfaces 12 is 0.05 µm to 0.15 µm, and the height ah is λ/5.5 n to λ/7.0 n (λ: wavelength of laser beams to be irradiated, n: refractive index of the base constituting the optical disc), and the track pitch is set to 0.6 µm. In this example, wavelength λ of light beams irradiated onto the optical recording medium is 780 µm.

The stamper constituted in this way satisfies standardization condition standardized in the optical disc, and have improved mold release characteristic at the time of molding.

Figure 4A:
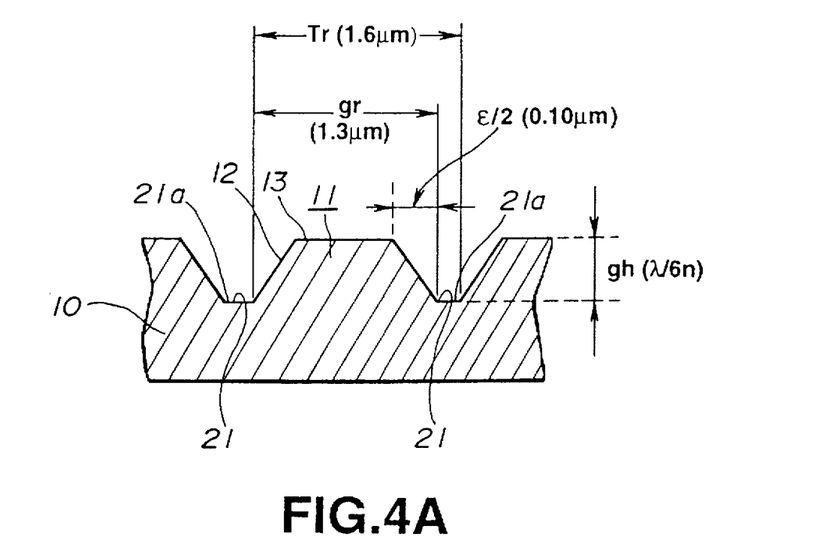
FIG. 4A is an essential part longitudinal cross sectional view showing the dimensional characteristic of the stamper according to this invention.
Figure 4B:
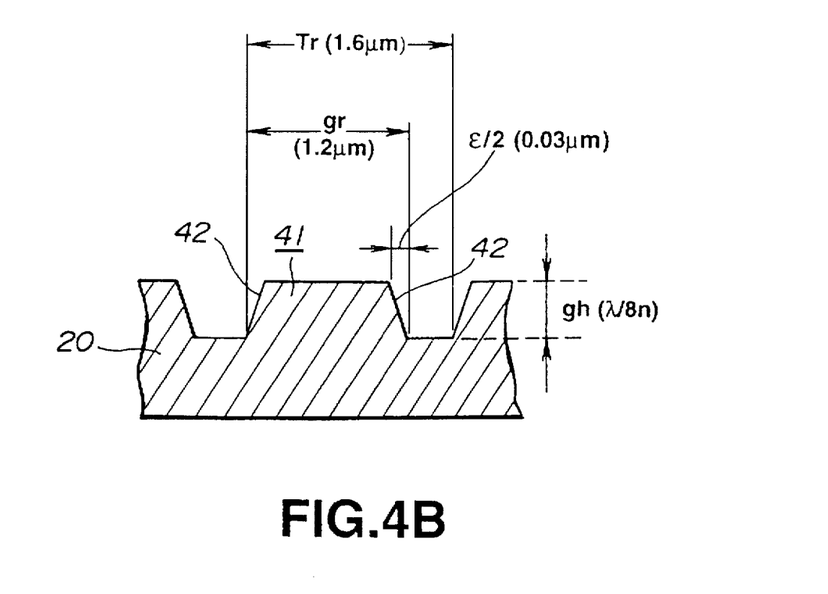
FIG. 4B is an essential part longitudinal cross sectional view showing the dimensional characteristic of the conventional stamper.

The occurrence state of mold release failure in the case where optical discs of the wide groove type in which track pitch Tr is 1.6 µm are molded by the stamper 10 of this embodiment and conventional stamper 20 will now be described with reference to FIGS. 4A to 4C. As the stamper 10 of this embodiment, there is used, as shown in FIG. 4A, a stamper formed so that width gr of bottom surface portion 21a of projection 11 which forms groove of the disc base is 1.3 µm, each width e/2 of the rising both side surfaces 12, 12 is 0.10 µm, and height gh is λ/5.5 n. Moreover, as the conventional stamper 20, there is used, as shown in FIG. 4B, a stamper formed so that width gr of projection 41 which forms groove of the disc base is 1.2 µm, each width e/2 of rising both side surfaces 42 is 0.03 µm, and height gh is λ/8 n.

Figure 4C:
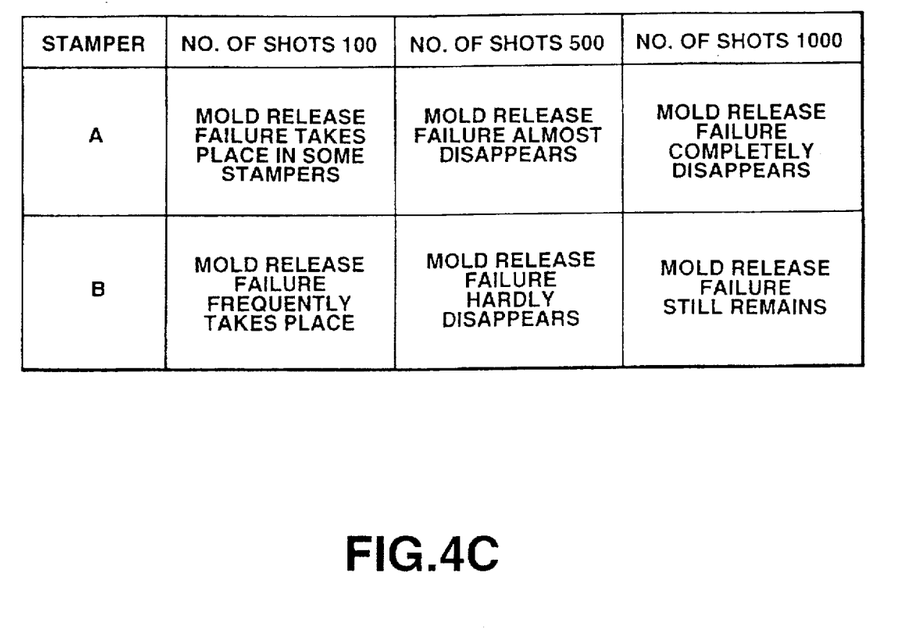
FIG. 4C is a view showing occurrence circumstances of mold release failure in the case where disc-shaped optical recording media are molded by using the stamper according to this invention and the conventional stamper.

The occurrence circumstances of mold release failure in the case where plural sets of stampers 10 of this embodiment and plural sets of conventional stampers 20 having the above-described shapes are respectively prepared to carry out molding processing of the base of the optical disc by the same molding condition was as shown in FIG. 4C. Namely, at the number of shots of 100, in molding of the disc base using the stamper 10 (labeled A in FIG. 4C) of this embodiment, mold release failure took place in some stampers, but the number of occurrence times was small. On the contrary, in molding of the disc base using the conventional stamper 20 (labeled B in FIG. 4C), mold lease failure frequently took place in most disc bases.

At the number of shots of 500, in the molding of the disc base by the stamper 10 of this embodiment, also with respect to stampers in which mold release failure has taken place in the number of shots of 100, occurrence of mold release failure has almost disappeared. On the other hand, in the molding of the disc base by the conventional stamper 20, there were circumstances where mold release failure still frequently takes place. Further, in the case where the number of shots is set to 1000, in the molding by the stamper 10 of this embodiment, occurrence of failure has been completely canceled also with respect to stampers where mold release failure has taken place to a little degree. On the contrary, in the case of the molding by the conventional stamper 20, there were circumstances where there is hardly change in occurrence circumstances of mold release failure, and mold release failure still frequently takes place.

It is to be noted that it is considered that the phenomenon in which according as the number of shots increases, mold release failure rate is lowered to more degree results from the fact that, e.g., mold releasing agent mixed into the resin material is gradually attached to the metal mold or the stamper so that the effect of the releasing agent is exhibited, but its effect is hardly expected in the conventional wide groove stamper 20. This results from difference in the molding characteristic between the stamper which molds disc base of the wide groove and the stamper which molds disc base of the narrow groove. Moreover, with respect to the improvement effect of the above-described occurrence of mold release failure, the effect which is substantially equivalent to the effect by the stamper 10 of this embodiment in which each width e/2 of the rising both side surfaces of projection 11 which forms groove is 0.10 µm was obtained also by the stamper in which each width e/2 of the rising both side surfaces of the projection 11 which forms groove of the disc base is set to 0.05 µm.

Figure 5:
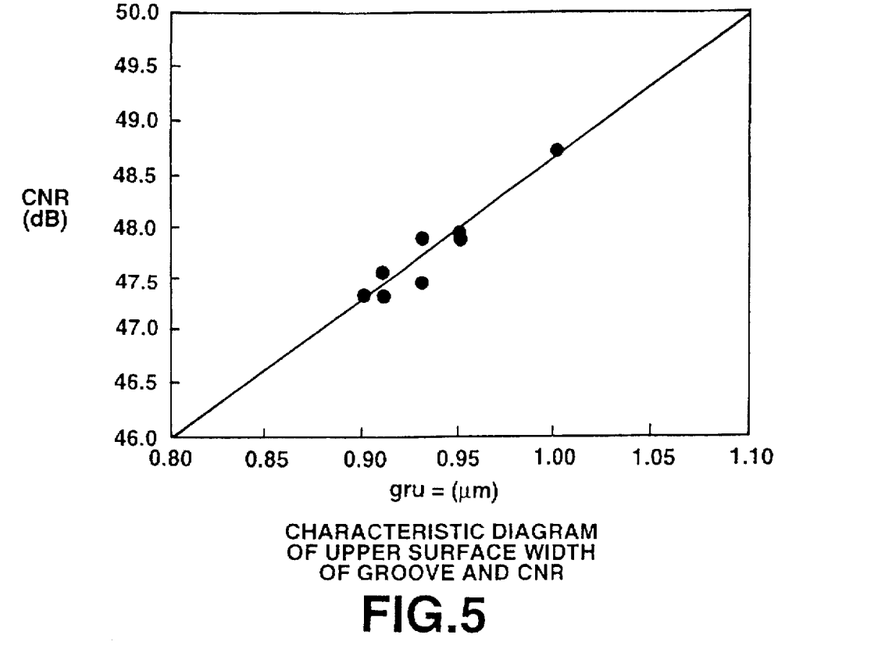
FIG. 5 is an actual measurement diagram of CNR values of disc bases molded by varying the width of the upper surface of projection in the state where the width of the projection which forms groove of the disc base of the stamper is fixed.

As described above, the disc base formed by using the stamper 10 of this embodiment in which improvement in mold release characteristic at the time of molding of the disc base has been made satisfies all of standardization conditions required for the optical disc. It is understood by actual measurement data shown in FIG. 5 that the CNR value and width gru of the upper surface portion 13 of projection 11 which forms groove of the disc base have the relationship that they are correlative with each other. Namely, FIG. 5 is a view obtained by plotting CNR lot average values (dB) on the ordinate when width gru (µm) of upper surface portion 13 of projection 11 on the abscissa is gradually changed in the case where width gr of the projection 11 is set to 1.2 µm. As apparent from FIG. 5, CNR is gradually increased by gradually increasing the width gru of the upper surface portion 13 of the projection 11 which forms groove.

Figure 6:
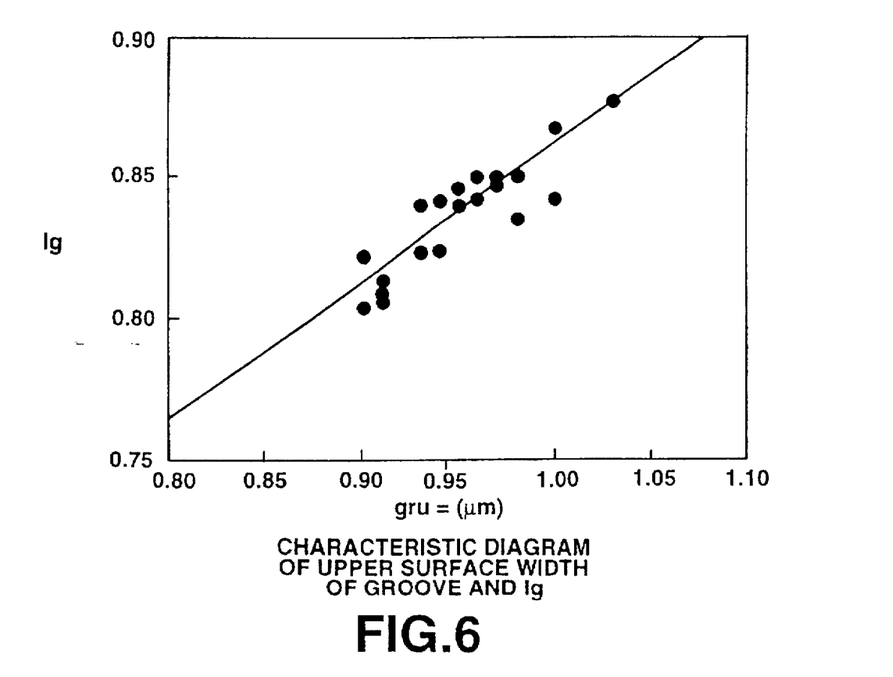
FIG. 6 is an actual measurement diagram of Ig values of disc bases molded by varying the width of the upper surface in the state where the width of the projection which forms groove of the disc base of the stamper is fixed.

Also with respect to the reflection factor $I_g$ from the upper surface portion 13 of the projection 11 of the stamper 10 which forms groove of the disc base and the width gru of the upper surface portion 13 of the projection 11 of the stamper 10 which forms groove of the disc base, it is understood by actual measurement data shown in FIG. 6 that those values have the relationship that they are correlative with each other. Namely, FIG. 6 is a view obtained by plotting lot reflection factors $I_g$ from the upper surface portion 13 on the ordinate when the width gru (µm) of the upper surface portion 13 of the projection 11 on the abscissa is gradually changed in the case where the width gr of the projection 11 is set to 1.2 µm. In this case, since it is impossible to directly measure reflection factor of the stamper 10, reflection factor of the disc base obtained by a process in which the manufactured stamper is used to mold a glass base, etc. serving as a disc base to manufacture the disc base by the manufacturing method using ultraviolet hardening resin as previously described from the molded glass disc base, etc. to vacuum-deposit aluminum on the manufactured disc base is indirectly used as reflection factor $I_g$ of the stamper 10.

The reflection factor $I_g$ is determined by an output signal of a bisected photodetector for receiving return light reflected from the disc base when laser beams are irradiated onto the upper surface portion 13 of the projection 11 which forms groove of the disc base, in practice, when laser beams are irradiated onto the disc base manufactured by using the stamper 10. This reflection factor $I_g$ is also gradually increased by gradually increasing the width gru of the upper surface portion 13 of the projection 11 which forms groove of the disc base as apparent from FIG. 6.

Meanwhile, CNR of the optical disc changes in dependency upon the format of the optical disc. In the standard of the optical disc system adapted for carrying out recording/ reproduction of audio data or general data, e.g., by using magneto-optical disc as an optical disc of diameter of 64 mm which permits re-recording of information signals, the CNR is standardized so that it is 46 dB or more. Moreover, it is sufficient that the reflection factor from the upper surface of groove of the disc base is within the range from 0.80 to 0.85. Because the CNR in FIG. 5 is lot average value, it is sufficient that the width gru of the upper surface portion 13 of the projection 11 of the stamper 10 which forms groove of the disc base is 0.90 µm or more so that the CNR is 47.5 dB which satisfies the standardized value. In this case, since the width gr of the projection 11 which forms groove is 1.2 µm or less, the maximum width dimension of each width e/2 of the rising both side surfaces is determined by the following expression:

(gr-gru)/2=(1.2-0.90)/2=0.15 (µm)

It is to be noted that it is sufficient that the minimum width of each width e/2 of the rising both side surfaces 12 of the projection 11 which forms groove is set to a value of 0.05 µm or more in which the effect of the mold release characteristic has been confirmed in the molding of the above-described actual disc base.

Moreover, it is sufficient that the reflection factor $I_g$ from the upper surface portion 13 of the projection 11 which forms groove of the stamper 10 is 0.80 or more. The optical disc using the disc base molded by using the stamper 10 in which the width gru of the upper portion 13 of the projection 11 which forms the above-described groove is 0.90 µm or more sufficiently satisfies the above-mentioned condition.

In the standard of the previously described optical disc system, standardization is made such that the RC value is 0.15 to 0.30 at the pit portion and is 0.20 to 0.35 at the groove portion of the optical disc. By this RC value, height gh of the projection 11 which forms groove is determined. In the above-described conventional stamper 20, angle of the taper portion of the rising both side surfaces 42 of the projection 41 which forms groove is large, and CNR is large. In this stamper 20, in order to satisfy the standard of the RC value, there takes place the necessity of reducing the projection 41 height dimension which forms groove. However, in the case where the height gh of groove and the height of pit of the optical disc are the same, e.g., in such cases of an optical disc standardized by the standard of the previously-described optical disc system, the RC value of pit does not satisfy the standard.

Figure 7:
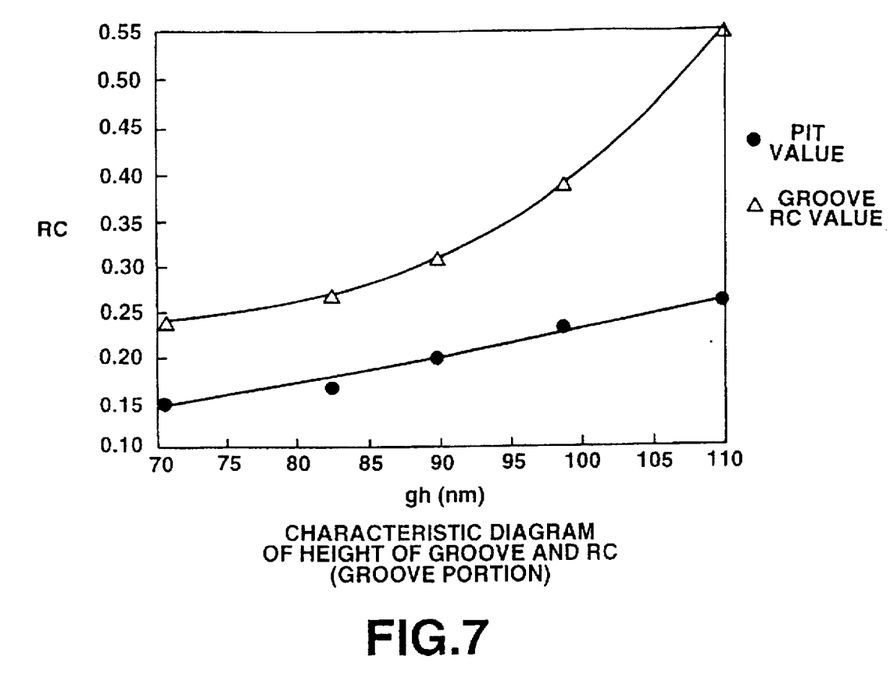
FIG. 7 is an actual measurement diagram of RC values of disc bases molded by varying height dimension of projection in the state where the width of the projection which forms groove of the disc base of the stamper is fixed.

FIG. 7 is a view obtained by plotting, on the ordinate, RC values of the portion which forms pit and the projection 11 which forms groove of the stamper 10 when height width gh (nm) of the projection 11 which forms groove on the abscissa is gradually changed in the case where width gr of the projection 11 which forms groove of the disc base is 1.2 µm. The RC value is gradually increased by gradually increasing the height gh of the projection 11 which forms groove of the stamper 10 as shown in FIG. 7. The standard conditions of RC values of pit and groove of the above-described optical disc are sufficiently both satisfied within the range where height gh of the projection 11 which forms groove of the stamper 10 is 0.08 µm to 0.95 µm with respect to the RC value 0.20 to 0.35 of groove of the optical disc.

In this case, height gh of the projection 11 which forms groove of the stamper 10 is determined by gh=λ/a x n. In this expression, wavelength λ of laser beams irradiated onto the optical recording medium is 780 nm, refractive index n of polycarbonate resin and refractive index n of acrylic resin generally used as material of the disc base are respectively 1.59 and 1.49. As a result, constant a for limiting the height gh of the projection 11 which forms the above-described groove so that it falls within 0.08 µm to 0.95 µm is set so that it falls within the range from 5.5 to 7.0.

Figure 8:
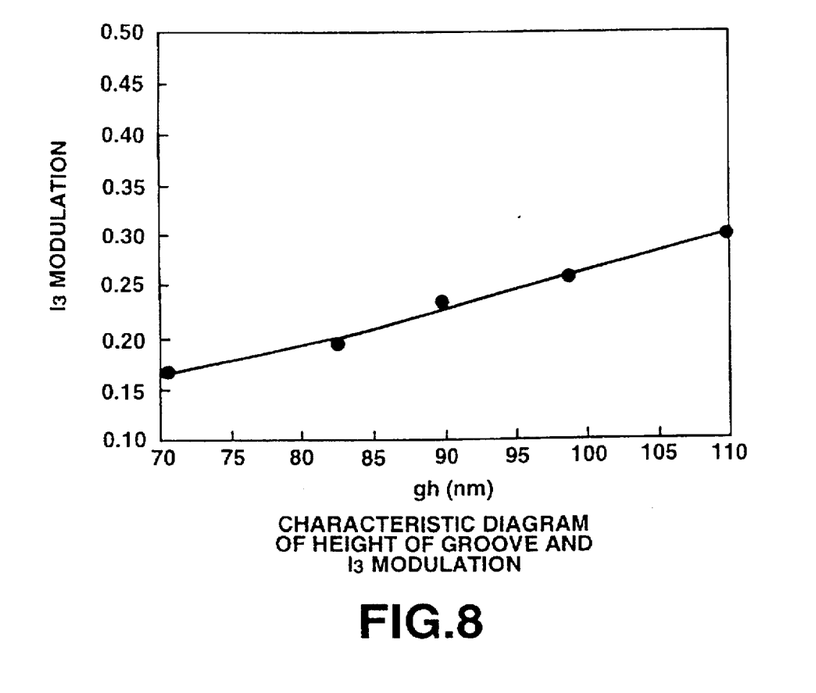
FIG. 8 is an actual measurement diagram of $I_3$ values of disc bases molded by varying height dimension of projection in the state where the width of the projection which forms groove of the disc base of the stamper is fixed.

In the previously described standard of the optic al disc, there is the standard condition of 15% or more with respect to the $I_3$ modulation. Also in the case where the height gh of the projection 11 forming groove of the stamper 10 which satisfies the standard condition of RC values of pit and groove is set so that it falls within the range from 0.08 µm to 0.95 µm as shown in FIG. 8, it is apparent that the above-mentioned condition is satisfied.

Figure 9:
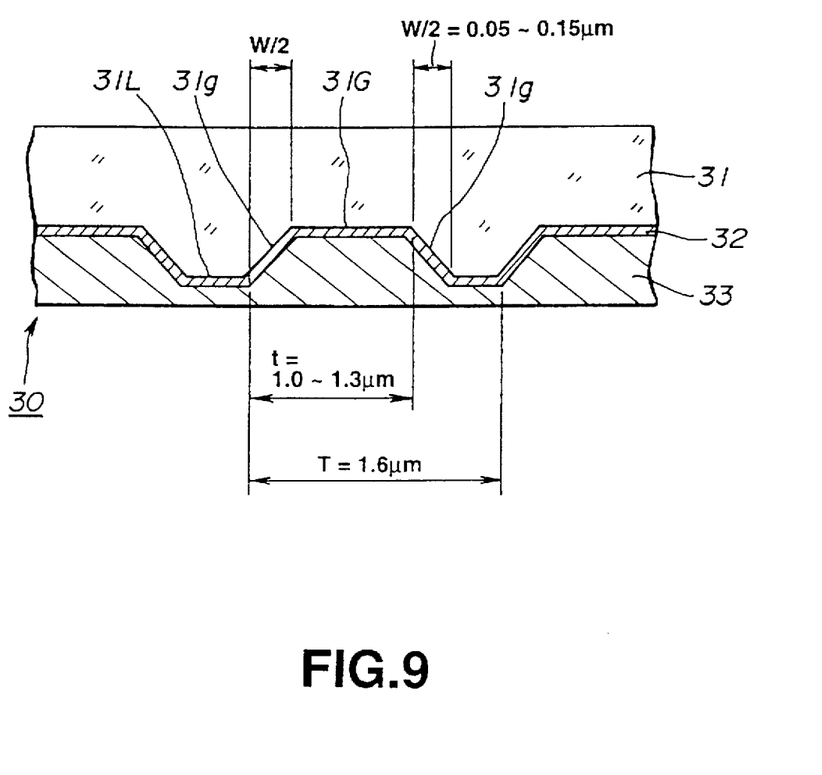
FIG. 9 is a partial cross sectional view showing the configuration of a disc base molded by the stamper shown in FIG. 3.

The optical disc 30 as an optical recording medium manufactured by using the disc base molded by using the stamper 10 shown in FIG. 3 will now be described with reference to FIG. 9.

This optical disc 30 is composed of a disc base (substrate) 31, a recording layer 32 and a protective layer 33. The disc base 31 is molded by a attaching the stamper 10 shown in FIG. 3 to the metal mold of the injection molding machine as previously described to fill synthetic resin material such as polycarbonate or PMMA (polymethyl methacrylate), etc. into the metal mold. The disc base 31 has groove 31G and 1 and 31L. The groove 31G is formed so as to take a concentric circular shape or spiral shape, and is formed so that its depth is $\lambda/5.5$ n to $\lambda/7.0$ n ($\lambda$ is wavelength of light beams irradiated onto the optical disc) and the width t of groove 31 is 1.0 to 1.3 µm. With the groove 31G being as tracking guide of light beams irradiated onto the optical disc 30, recording of information signals is carried out at the portion of the land 31L by light beams and reading operation of information signals recorded on the land 31L is carried out by light beams. At this time, light beams are irradiated onto the recording layer 32 from the above in FIG. 9 so that they are in focus therewith. The groove 31G connects the portion between the groove 31G and the land 31L by inclined surface 31g. The width w/2 of the inclined surface 31g is 0.05 to 0.15 µm. By setting the width w/2 of the inclined surface 31g so that it is equal to 0.05 to 0.15 µm, it is possible to improve mold releasing characteristic from the stamper, and to reduce quantity of the releasing agent mixed. As a result, it is possible to suppress that the optical characteristic of the disc base 31 is changed by deterioration with age of the disc base 31, in its turn, the optical disc 30. The track pitch of the optical disc 30 using the disc base 31 formed in this way is 1.6 µm, and the entire thickness of the optical disc 30 is substantially 1.2 mm.

The recording layer 32 is deposited on the surface where groove 31G and land 31L are formed of the disc base 31 so as to cover the surface where groove 31G and land 31L are formed of the disc base. With respect to the recording layer 32, in the case where the optical disc 30 is reproduction only optical disc like so called compact disc, metal material such as aluminum or gold, etc. is formed on the disc base 31 by vacuum deposition or sputtering. In the case where the optical disc 30 is an optical disc which permits recording of information signals, organic pigment, magneto-optical recording material, or phase change type optical recording material is formed by painting, or vacuum-deposition or sputtering as previously described.

The protective layer 33 is formed, in order to protect the recording layer 31, so as to cover the entire surface of the recording layer 31 on the recording layer 31 by using ultraviolet hardening resin, etc. As occasion demands, print such as label, etc. is implemented onto the protective layer 33 by the technique such as silk printing, etc.

In the case of the optical disc 30 manufactured in this way, since quantity of releasing agent mixed for the purpose of improving mold releasing characteristic when disc base is released from the metal mold is small, deterioration of the optical characteristic by deterioration with age is small.

Industrial Applicability

The stamper according to this invention is used to mold a base for optical recording medium, thereby making it possible to improve mold releasing characteristic from the stamper of the molded base, and to manufacture a base for optical recording medium free from unsatisfactory transfer and/or abnormal polarization, etc.

In addition, in accordance with this invention, it is possible to provide a base for optical recording medium which has no abnormal polarization or unsatisfactory appearance, etc., and satisfies the conditions of the standard, etc. It should be understood that various changes and modifications to the presently preferred embodiments will be apparent to those skilled in the art. Such changes and modifications may be made without changing the spirit and scope of the present invention and without diminishing its attendant advantages. Therefore, such changes and modifications are intended to be covered by the appended claims.

What is claimed is:

1. A stamper for manufacturing a base of an optical recording medium, said optical recording medium including grooves having a width of 1.3 µm or less, said stamper comprising:

a plurality of projections for forming the grooves, each projection having a flat upper surface portion and a pair of rising portions disposed on opposite sides of said upper surface portion; and a plurality of recessed portions each including a flat bottom surface disposed between adjacent rising portions on adjacent projections, each rising portion including a width dimension e/2 such that 0.05 µm$\leq$e/2$\leq$0.15 µm, and a height dimension, gh, defined between an adjacent upper surface portion and a bottom surface such that $\lambda/7.0$ n$\leq$gh$\leq\lambda/5.5$ n, wherein n is a refractive index of the base of the optical recording medium and $\lambda$ is a wavelength of light beams irradiated onto the base of the optical recording medium.

2. A stamper for manufacturing a base of an optical recording medium from a synthetic resin material, said optical recording medium including grooves having a width of 1.3 µm or less, said stamper comprising:

a plurality of projections for forming the grooves, each projection having a flat upper surface portion and a pair of rising portions disposed on opposite sides of said upper surface portion; and a plurality of recessed portions each including a flat bottom surface disposed between adjacent rising portions on adjacent projections, each rising portion including a width dimension e/2 such that 0.05 µm$\leq$e/2$\leq$0.15 µm, and a height dimension, gh, defined between an adjacent upper surface portion and a bottom surface such that $\lambda/7.0$ n$\leq$gh$\leq\lambda/5.5$ n, wherein n is a refractive index of the base of the optical recording medium and $\lambda$ is a wavelength of light beams irradiated onto the base of the optical recording medium.

3. A base for an optical recording medium molded by injection molding by using a stamper, the stamper comprising:

a plurality of projections for forming the grooves, each projection having a flat upper surface portion and a pair of rising portions disposed on opposite sides of said upper surface portion; and a plurality of recessed portions each including a flat bottom surface disposed between adjacent rising portions on adjacent projections, each rising portion including a width dimension e/2 such that 0.05 µm$\leq$e/2$\leq$0.15 µm, and a height dimension, gh, defined between an adjacent upper surface portion and a bottom surface such that $\lambda/7.0\ n \leq gh \leq \lambda/5.5\ n$, wherein n is a refractive index of the base of the optical recording medium and $\lambda$ is a wavelength of light beams irradiated onto the base of the optical recording medium.

4. A base for an optical recording medium molded by a stamper, said stamper comprising a plurality of projections for forming grooves, each projection being provided with a flat upper surface portion and a pair of rising portions provided on both sides of the upper surface portion, and a plurality of recess portions having flat bottom surfaces disposed between adjacent rising portions on adjacent projections, the base for the optical recording medium having a plurality of grooves formed by the plurality of projections of the stamper, each groove having a bottom surface portion formed by the upper surface portion of the stamper and a pair of inclined surface portions formed continuously to the bottom surface portion by the rising portions of the stamper and a plurality of lands formed by the plurality of recess portions of the stamper, each groove having a width dimension of 1.3 µm or less, each inclined surface portion having a width $\epsilon/2$ such that 0.05 µm is $\leq \epsilon/2 \leq 0.15$ µm; each groove further having a height dimension h such that $\lambda/7.0\ n \leq h \leq \lambda/5.5\ n$, wherein n is a refractive index of the base of the optical recording medium and $\lambda$ is a wavelength of light beams irradiated onto the base of the optical recording medium.

* * * * *